United States Patent [19]

Yarch et al.

[11] Patent Number: 6,003,122

[45] Date of Patent: *Dec. 14, 1999

[54] DIRECT MEMORY ACCESS CONTROLLER

[75] Inventors: Mark A. Yarch, Chandler; Byron R. Gillespie, Phoenix, both of Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/724,179

[22] Filed: Sep. 30, 1996

Related U.S. Application Data

[63] Continuation of application No. 08/581,494, Dec. 29, 1995, Pat. No. 5,859,990.

[51] Int. Cl.$^6$ .................................................. G06F 13/00
[52] U.S. Cl. ........................ 711/201; 395/842; 395/886; 395/182.22
[58] Field of Search ..................... 711/201, 5; 395/311, 395/842, 886, 182.22, 182.21, 182.08, 183.01, 652, 182.09, 500, 200.83, 840; 371/40.11

[56] References Cited

U.S. PATENT DOCUMENTS

| | | | |
|---|---|---|---|
| 4,376,972 | 3/1983 | Johnson et al. ........................ | 711/201 |
| 4,396,982 | 8/1983 | Wada et al. ............................ | 711/201 |
| 4,782,439 | 11/1988 | Borkar et al. . | |
| 4,803,618 | 2/1989 | Ita et al. . | |
| 4,931,925 | 6/1990 | Utsumi et al. ........................ | 711/201 |
| 5,119,487 | 6/1992 | Taniai et al. . | |
| 5,121,480 | 6/1992 | Bonke et al. . | |
| 5,168,561 | 12/1992 | Vo ......................................... | 395/842 |
| 5,450,551 | 9/1995 | Amini et al. . | |
| 5,517,627 | 5/1996 | Petersen ................................. | 395/311 |
| 5,550,988 | 8/1996 | Sarangdhar et al. . | |
| 5,561,816 | 10/1996 | Mitsuhira et al. . | |
| 5,581,711 | 12/1996 | Takeshige . | |
| 5,594,875 | 1/1997 | Thaller . | |
| 5,603,050 | 2/1997 | Wolford et al. ....................... | 395/842 |
| 5,628,026 | 5/1997 | Baron et al. . | |
| 5,659,798 | 8/1997 | Blumrich et al. ..................... | 395/842 |
| 5,701,517 | 12/1997 | Carpenter ............................... | 395/886 |

OTHER PUBLICATIONS

U.S. application No. 08/964,077, Yarch et al., filed Nov. 4, 1997.

U.S. application No. 08/964,389, Yarch et al., filed Nov. 6, 1997.

*Primary Examiner*—Parshotam S. Lall
*Assistant Examiner*—Bau Trong Le
*Attorney, Agent, or Firm*—Blakely, Sokoloff, Taylor & Zafman LLP

[57] ABSTRACT

An alignment logic circuit transferring segments of data from a first storage device to a second storage device is provided. The alignment logic circuit includes a first and second alignment stages, and an alignment control logic that controls the first and second alignment stages such that the first alignment stage outputs data aligned in a first dimension according to a second configuration, and the second alignment stage outputs data aligned in a second dimension according to the second configuration.

A computer system with a DMA controller with a Memory Write and Invalidate logic circuit is provided. The Memory Write and Invalidate logic circuit generates a Memory Write and Invalidate enable signal when the DMA byte count is greater than or equal to a cacheline size, and the current transfer adders is a multiple of the cacheline size.

A computer system including a host processor, a first bus coupled to the host processor, a second bus, slave circuit coupled to the second bus, and a direct memory access (DMA) controller is also provided. The DMA controller includes a DMA error handling logic, coupled to the host processor, for receiving a retry signal indicative of a retry request of the slave circuit. The DMA error handling logic also receives an error signal indicative of an error on the first bus and a DMA IDLE. The error handling logic aborts a DMA transfer when the error signal and the DMA signal are asserted and the retry signal is deasserted.

15 Claims, 14 Drawing Sheets

FIG. 4a

```
1  Alg33_22_11_00      <= (AdrAlgStartqlrx = AdrAlgEndqlrx) ;

2  Alg32_21_10_03      <= (AdrAlgStart = 0 and AdrAlgEnd =3) OR
                          (AdrAlgStart = 1 and AdrAlgEnd =0) OR
                          (AdrAlgStart = 2 and AdrAlgEnd =1) OR
                          (AdrAlgStart = 3 and AdrAlgEnd =2) ;

3  Alg31_20_13_02      <= (AdrAlgStart = 0 and AdrAlgEnd =2) OR
                          (AdrAlgStart = 1 and AdrAlgEnd =3) OR
                          (AdrAlgStart = 2 and AdrAlgEnd =0) OR
                          (AdrAlgStart = 3 and AdrAlgEnd =1) ;

4  Alg30_23_12_01      <= (AdrAlgStart = 0 and AdrAlgEnd =1) OR
                          (AdrAlgStart = 1 and AdrAlgEnd =2) OR
                          (AdrAlgStart = 2 and AdrAlgEnd =3) OR
                          (AdrAlgStart = 3 and AdrAlgEnd =0) ;

5  MuxOut (31 downto 24)
         <= AlgIn (31 downto 24) when Alg33_22_11_00 = '1' ELSE
            AlgIn (23 downto 16) when Alg30_23_12_01 = '1' ELSE
            AlgIn (15 downto  8) when Alg31_20_13_02 = '1' ELSE
            AlgIn ( 7 downto  0) ;

6  MuxOut (23 downto 16)
         <= AlgIn (31 downto 24) when Alg32_21_10_03 = '1' ELSE
            AlgIn (23 downto 16) when Alg33_22_11_00 = '1' ELSE
            AlgIn (15 downto  8) when Alg30_23_12_01 = '1' ELSE
            AlgIn ( 7 downto  0) ;

7  MuxOut (15 downto 8)
         <= AlgIn (31 downto 24) when Alg31_20_13_02 = '1' ELSE
            AlgIn (23 downto 16) when Alg32_21_10_03 = '1' ELSE
            AlgIn (15 downto  8) when Alg33_22_11_00 = '1' ELSE
            AlgIn ( 7 downto  0) ;

8  MuxOut ( 7 downto 0)
         <= AlgIn (31 downto 24) when Alg30_23_12_01 = '1' ELSE
            AlgIn (23 downto 16) when Alg31_20_13_02 = '1' ELSE
            AlgIn (15 downto  8) when Alg32_21_10_03 = '1' ELSE
            AlgIn ( 7 downto  0) ;
```

FIG. 4b

9  EnB3Latqlr   <= (AdrAlgStart = 0                               ) OR
                  (AdrAlgStart = 1 and AdrAlgEnd  =1 or 2 or 3) OR
                  (AdrAlgStart = 2 and AdrAlgEnd  =2 or 3)     OR
                  (AdrAlgStart = 3 and AdrAlgEnd  =3           );

10 EnB2Latqlr   <= (AdrAlgStart = 0 and AdrAlgEnd =0 or 1 or 2) OR (AdrAlgStart = 2 and AdrAlgEnd =1 or 2 or 3) OR
                  (AdrAlgStart = 3 and AdrAlgEnd =2 or 3      );

11 EnB1Latqlr   <= (AdrAlgStart = 0 and AdrAlgEnd =0 or 1)     OR
                  (AdrAlgStart = 1 and AdrAlgEnd =0 or 1 or 2) OR
                  (AdrAlgStart = 2                          )  OR
                  (AdrAlgStart = 3 and AdrAlgEnd =1 or 2 or 3) ;

12 EnB0Latqlr   <= (AdrAlgStart = 0 and AdrAlgEnd =0)          OR
                  (AdrAlgStart = 1 and AdrAlgEnd =0 or 1)      OR
                  (AdrAlgStart = 2 and AdrAlgEnd =0 or 1 or 2) OR
                  (AdrAlgStart = 3                          );

FIG. 5a

| SRC/DEST ADDR. | MUX CONTROL | TEMPORARY FLIP FLOP ENABLE |
|---|---|---|
| 0 TO 0 | B3 TO B3 | S3 |
|  | B2 TO B2 | S2 |
|  | B1 TO B1 | S1 |
|  | B0 TO B0 | S0 |
| 0 TO 1 | B3 TO B0 | S3 |
|  | B2 TO B3 | S2 |
|  | B1 TO B2 | $\overline{S1}$ |
|  | B0 TO B1 | S0 |
| 0 TO 2 | B3 TO B1 | S3 |
|  | B2 TO B0 | S2 |
|  | B1 TO B3 | $\overline{S1}$ |
|  | B0 TO B2 | $\overline{S0}$ |
| 0 TO 3 | B3 TO B2 | S3 |
|  | B2 TO B1 | $\overline{S2}$ |
|  | B1 TO B0 | $\overline{S1}$ |
|  | B0 TO B3 | $\overline{S0}$ |
| 1 TO 0 | B3 TO B2 | $\overline{S3}$ |
|  | B2 TO B1 | S2 |
|  | B1 TO B0 | S1 |
|  | B0 TO B3 | S0 |
| 1 TO 1 | B3 TO B3 | S3 |
|  | B2 TO B2 | S2 |
|  | B1 TO B1 | S1 |
|  | B0 TO B0 | S0 |
| 1 TO 2 | B3 TO B0 | S3 |
|  | B2 TO B3 | S2 |
|  | B1 TO B2 | S1 |
|  | B0 TO B1 | $\overline{S0}$ |
| 1 TO 3 | B3 TO B1 | S3 |
|  | B2 TO B0 | S2 |
|  | B1 TO B3 | $\overline{S1}$ |
|  | B0 TO B2 | $\overline{S0}$ |

FIG. 5b

| SRC/DEST ADDR. | MUX CONTROL | TEMPORARY FLIP FLOP ENABLE |
|---|---|---|
| 2 TO 0 | B3 TO B1 | $\overline{S3}$ |
|  | B2 TO B0 | $\overline{S2}$ |
|  | B1 TO B3 | S1 |
|  | B0 TO B2 | S0 |
| 2 TO 1 | B3 TO B2 | $\overline{S3}$ |
|  | B2 TO B1 | S2 |
|  | B1 TO B0 | S1 |
|  | B0 TO B3 | S0 |
| 2 TO 2 | B3 TO B3 | S3 |
|  | B2 TO B2 | S2 |
|  | B1 TO B1 | S1 |
|  | B0 TO B0 | S0 |
| 2 TO 3 | B3 TO B0 | S3 |
|  | B2 TO B3 | S2 |
|  | B1 TO B2 | S1 |
|  | B0 TO B1 | $\overline{S0}$ |
| 3 TO 0 | B3 TO B0 | $\overline{S3}$ |
|  | B2 TO B3 | $\overline{S2}$ |
|  | B1 TO B2 | $\overline{S1}$ |
|  | B0 TO B1 | S0 |
| 3 TO 1 | B3 TO B1 | S3 |
|  | B2 TO B0 | S2 |
|  | B1 TO B3 | $\overline{S1}$ |
|  | B0 TO B2 | $\overline{S0}$ |
| 3 TO 2 | B3 TO B2 | $\overline{S3}$ |
|  | B2 TO B1 | S2 |
|  | B1 TO B0 | S1 |
|  | B0 TO B3 | S0 |
| 3 TO 3 | B3 TO B3 | S3 |
|  | B2 TO B2 | S2 |
|  | B1 TO B1 | S1 |
|  | B0 TO B0 | S0 |

DIRECT MEMORY ACCESS CONTROLLER

This is a continuation of application Ser. No. 08/581,494 filed Dec. 29, 1995, now U.S. Pat. No. 5,859,990.

BACKGROUND OF THE INVENTION

(1) Field of the Invention

The present invention relates to the field of computer systems architecture. More specifically, the present invention relates to Direct Memory Access (DMA) controllers.

(2) Description of Related Art

DMA controllers are used in computer systems for moving blocks of data from one location to another location, while relieving the host processor of the need to generate a long sequence of addresses to accomplish the transfer of data. Typically, the data transferred is a large block of data which begins at a source address and is moved to a destination beginning at a destination address. The DMA controller is started by an event responsive to which the DMA controller generates addresses of a source location and of a destination location wherein data is transferred.

In many storage devices such as memories, data can be stored on double-word boundaries, each double-word consisting of four bytes of data. In such memories, each read or write cycle, from or to the memory, involves accessing a double-word from either the source or the destination memory. Data, however, may be stored on boundaries other than double-word such as byte or word boundaries. However, a DMA transfer of a block of data between a source storage device and a destination storage device becomes more complicated when the starting address in the source storage device does not align on byte boundaries with the starting address in the destination storage device.

FIG. 1 shows a source storage device 2 storing a block of twelve bytes of data starting at address 000 0201H. This address corresponds to the address of the first byte of data of the block of twelve bytes stored in the source storage device 2. The first byte of data of the block resides at the second byte location of the double word having the address 000 0200H. The block of data from the source storage device is received by the destination storage device 4 which stores this block beginning with the fourth byte of data of the double word having the address 4001 0300H. According to this configuration, a DMA controller would have to read bytes $B_1$, $B_2$, and $B_3$ of the first double word starting at address 000 0200H. Then, bytes $B_1$, $B_2$, and $B_3$ would be written in one cycle to a temporary storage device. The DMA controller would then, in another cycle, write byte $B_1$ in the destination storage device at address 4001 0303H. A second read operation from the source storage device would retrieve the double word starting at address 000 0204H. Bytes $B_4$ and $B_5$ would thus have to be stored in, the temporary storage device together, with bytes $B_2$ and $B_3$ aligned in the sequence $B_5$ $B_4$ $B_3$ $B_2$. However, bytes $B_6$ and $B_7$ together with $B_5$ and $B_4$ from address 000 0204H would have to be read again from the source storage device in a next cycle because the temporary storage device would be full with the double-word $B_5$ $B_4$ $B_3$ $B_2$. As one can see, the discrepancy in alignment between the configuration of the block of data stored in the source storage device 2 and the configuration of data to be stored in the destination storage device 4 causes an additional read cycle penalty (i.e., reading from the source storage device the double word including the sequence $B_5$ $B_4$ $B_3$ $B_2$).

It is desirable to provide a faster and more efficient mechanism for aligning data transferred from a source storage device 2 into a destination storage device 4 on byte, word, and double word boundaries. This is particularly critical in applications requiring transfer of blocks of data at high speed.

DMA controllers can be particularly useful in conjunction with a Peripheral Component Interconnect (PCI) system. Integration of a DMA controller into a PCI system, however, may require compliance with PCI protocols for transfer of data. For example, in a PCI system, according to the revision 7.1 of the PCI Special Interest Group located in Portland, Oreg., local memory to PCI transfers can be performed by means of two PCI write commands: Memory Write (MW), and Memory Write and Invalidate (MWI). The Memory Write (MW) can be used by a computer system in which a DMA controller is integrated to write data to a PCI agent. The Memory Write command is a command compatible with the PCI system architecture which is used to update data in the memory. A Memory Write and Invalidate (MWI) command is semantically similar to the Memory Write command except that it additionally guarantees a minimum transfer of one complete cacheline during the current transaction. According to this command, the master intends to write all bytes within an address cacheline in a single PCI transaction unless the master is interrupted by the target. This command allows a memory performance optimization by invalidating a dirty line in a write-back cache without requiring the actual write-back cycle, thus shortening access time. If the target, i.e., the PCI agent is cacheable memory, the Memory Write and Invalidate (MWI) command improves the system performance. For more information about the PCI systems and the Memory Write and Invalidate command, see The PCI Local Bus Specification, revision 2.1 of the PCI Special Interest Group, located in Portland, Oreg.

In order to use the Memory Write and Memory Write and Invalidate commands on the PCI bus when a DMA transfer between local memory and PCI bus is desired, a DMA channel has to be programmed by the application software. However, there are a number of circumstances which may prevent a DMA controller from actually initiating the MWI command. For example, to satisfy the PCI requirements for MWI, the PCI master such as a DMA controller would have to start a transaction on a cacheline boundary and transfer at least one cacheline of data without interruption. The application software would need to be responsible for compliance with the PCI requirements.

Observance of the PCI requirements by the application software, however, poses significant overhead problems. The software would first have to be fairly complicated, and the system performance would be affected by the use of the respective software design. A hardware mechanism, providing full PCI compliance for a DMA controller transferring data between a local and a PCI bus would be advantageous over software implementation. It is, thus, desirable to provide for a hardware apparatus for implementing MWI and MW transfers of data on a DMA controller for transferring data between a local and a PCI bus.

Additionally, the implementation of a DMA controller in conjunction with a PCI system may be confronted with significant problems when errors on the local bus need to be handled. For example, if a local bus error occurs after a PCI retry is received from a slave circuit, the DMA controller may not be able to terminate the transfer. A retry request, in PCI compliant systems, is typically generated by a slave circuit to a master circuit, such as a DMA controller if the slave is unable to respond to a transaction at a current time. According to PCI revision 2.1, the DMA controller would first need to service the retry request. Otherwise, if the retry is not serviced, the PCI slave could lock up.

An example of the need for a retry in PCI systems would be if the slave is currently locked for exclusive access by another master. The occurrence of a local bus error followed by a PCI retry poses the following problem. In order to avoid transferring data, which might contain errors, from the local bus to the PCI bus, it would be desirable to end the transfer when the error signal from the local bus is received. However, a transfer cannot be terminated until the retry is satisfied. In order to satisfy the retry, the DMA controller needs to prevent the host processor from noticing that an error has occurred. If the DMA controller did not convey the host processor the error message and serviced the retry from the slave which initially generated the retry signal, the host processor would retain ownership over the PCI bus and, thus, the transfer of the block of data programmed to be transferred in a DMA transfer would continue. Continuing the transfer of data after having received an error message would, however, require sophisticated error handling logic circuit. Such error handling logic circuit would be expensive due to the complexity of this circuit.

It is, thus, desirable to provide a DMA error handling logic capable of handling with minimum overhead a local bus error after a PCI retry request. It is also desirable to provide a mechanism capable of servicing a pending retry and aborting the DMA transfer in course, once the retry was serviced, without the need to substantially change the design of the error handling logic.

BRIEF SUMMARY OF THE INVENTION

The present invention provides a computer system including a first storage device. The computer system, according to the present invention, further includes a second storage device and a direct memory access controller (DMA) that transfers data between the first storage device and the second storage device. The second storage device is partitioned into a plurality of bytes and into a plurality of storage lines. Each storage line includes a first predetermined number N of bytes. The DMA controller includes a first circuit that stores a DMA byte count, a second circuit that stores the predetermined number N of bytes, a third circuit that stores a current transfer address, and a Memory Write and Invalidate (MWI) logic circuit. The Memory Write and Invalidate logic circuit is coupled to the first, second, and third circuits. The Memory Write and Invalidate logic circuit generates an MWI enable signal when the byte count is greater than or equal to the predetermined number N and the current transfer address is a multiple of the number N.

In another aspect of the present invention, it is provided a computer system including a host processor, a first bus coupled to the host processor, a second bus, a slave circuit coupled to the second bus, and a direct memory access controller (DMA). The DMA performs DMA transactions between the first and second buses. The DMA controller includes a DMA error handling logic, coupled to the host processor, that receives a RETRY signal indicative of a RETRY request of the slave circuit. The DMA error handling logic also receives an error signal indicative of an error on the first bus. Furthermore, the DMA error handling logic receives an IDLE signal indicating that the DMA is idle. The error handling logic aborts a DMA transfer when the ERROR signal is asserted, the RETRY signal is deasserted.

BRIEF DESCRIPTION OF THE DRAWINGS

The features, aspects, and advantages of the present invention will become more fully apparent from the following detailed description, appended claims, and the accompanying drawings in which:

FIGS. 4A and 4B displays a pseudo-code listing for an alignment control logic according to the present invention;

FIGS. 5a and 5b show in a tabular representation the configuring of the control signals to the first and the second alignment stage of the apparatus according to the present invention;

DETAILED DESCRIPTION OF THE INVENTION

Figure 1:
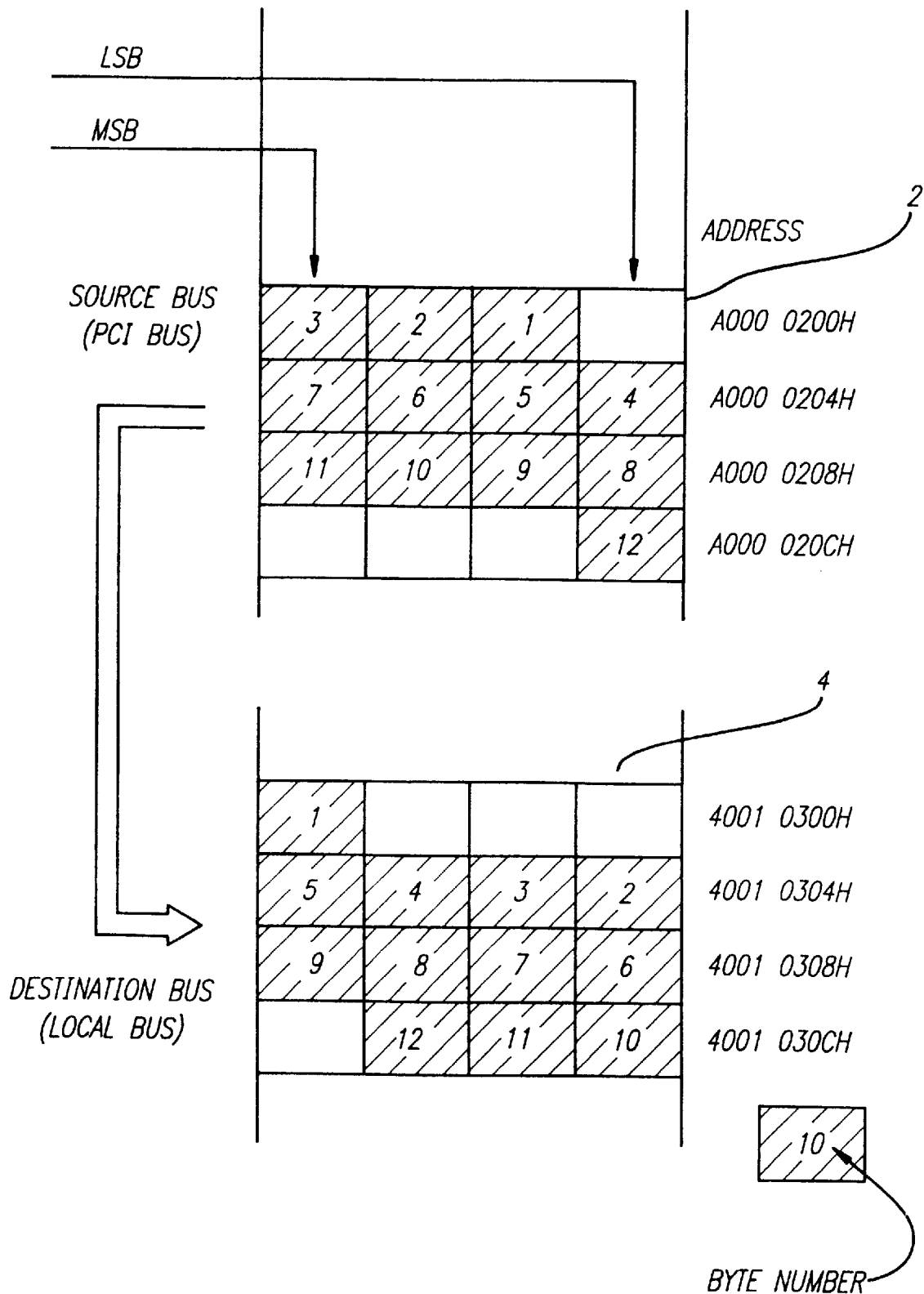
FIG. 1 shows a illustrates storage device having data arranged in a first configuration, and a second storage device having data arranged in a second configuration.

In the following description, numerous specific details are set forth to provide a thorough understanding of the present invention. However, one having an ordinary skill in the art may be able to practice the invention with the specific details. In some instances, well-known circuits, structures, and techniques have not been shown in detail not to unnecessarily obscure the present invention.

FIG. 2 illustrates an alignment logic 200 for transferring data according to the present invention. This configuration is hereinafter explained in conjunction with a DMA controller transferring data between a local bus coupled to a first storage device 202 and a queue (second storage device 204) coupled to a PCI bus. However, the present invention is not limited to a DMA transfer to a local bus and to a PCI bus. The present invention can be utilized in conjunction with other devices wherein data is transferred between a first storage device and a second storage device.

A multiplexer 206 is coupled at an output 210 thereof, via a first bus 218, to the apparatus for transferring data 200, according to the present invention. Multiplexer 206 is coupled at an input 211 thereof to a first storage device 202, which can be, by way of non-limiting example, a local memory, and to a destination storage device second storage device 204, which can be, by way of non-limiting example, a queue of a DMA controller or another type of storage device coupled to a PCI bus (not shown). The apparatus 200 offers the possibility for transferring data from both a PCI bus to a local bus and from a local bus to a PCI bus. The multiplexer 206 has a control input 208 that receives a signal, $PCI_{WRITE}$, indicating whether a data transfer is directed from the local bus to the PCI bus or vice versa. According to this signal data, from either the local storage device 202 or from the storage device 204, is selectively gated via output 210 of multiplexer 206 to apparatus 200 via first bus 218.

For purposes of the following description, one will assume that the source storage device 202 has data arranged according to the configuration of the data in the source storage device 2 shown in FIG. 1 and the destination storage device 204 stores data, transferred from the source storage device, configured as data in the destination storage device 4 shown in FIG. 1. A data configuration is hereinafter defined as an arrangement of bytes of data in a storage device having a two-dimensional structure, i.e., divided in columns and rows. A data configuration is determined by the position (row-wise and column-wise) of the first byte of data of a block and by the number of rows storing the data of the block. As one can see in FIG. 1, data is aligned in both the source storage device and the destination storage device according to a row and a column. For example, byte number 5, in the source storage device 2, is aligned in a first data configuration in row 2, column 2. However, byte number 5 is aligned in a second data configuration, in the second storage device 4, in row 2, column 4. Hereinafter, the source storage device and the destination storage device is denominated as the first storage device and the second storage device.

The alignment logic circuit 200 of FIG. 2 includes a first alignment stage 212 having an input 214 coupled to the first storage device (202 or 204) via the multiplexer 206. In the preferred embodiment shown in FIG. 2, the first stage 212 includes four 8-bit-wide 4/1 multiplexers. The number of multiplexers of the first stage equals the number of segments of data or bytes that are found in each row of each of the storage devices. Since there are four bytes of data, in each row of the first and the second storage devices, the first stage 212 of the alignment logic includes four multiplexers 216. However, the present invention is not limited to storage devices including four bytes of data on each row and, thus, is not limited to four multiplexers in the first stage. The number of bytes in a row can vary according to the desired application. In such case, the number of multiplexers 216 will equal the number of bytes of data contained in each row of the first and second storage devices.

The alignment logic 200 further includes a first bus 218 coupled to the multiplexer 206. The first bus 218, in this particular embodiment, includes four 8-bit lines L(i) 220 where i=0 through 3. In general, for storage devices including N bytes of data in each row, the first bus 218 includes N 8-bit lines L(i) for i=0 through N−1. Each of the lines 220 correspond to one byte B(i) of the first storage device for i=0 through N−1. As one can see in this figure, each of the line L(i) 220 will thus drive one byte of data B(i) having a position identified by the index i. Each of the multiplexers 216 has an input 222 coupled to one of the lines L(i) for i=0 through N−1. In this particular embodiment, multiplexers 216 have four 8-bit inputs 222, each input being coupled to a corresponding line 220 L(i). For example, multiplexer M3 has a first 8-bit input 222 coupled to the line L(0), a second input 223 coupled to the line L(1), a third input 224 coupled to the line L(2), and a fourth input 225 coupled to the line L(3). The other multiplexers M0, M1, and M2 are coupled in the same way to the lines L(0), L(1), L(2), and L(3). In such way, each multiplexer 216 can receive, at one time, all four bytes of data stored in one row of the first storage device 202. However, only one of the inputs of each of the multiplexer 216 is selectively supplied at the output 226 of each multiplexer.

An alignment control logic 228 is coupled to the first stage 214 via line 230. Line 230 is a 4-bit line, in this particular embodiment, wherein each bit line is coupled to a different control gate 232 of the multiplexers 216. The alignment control logic 228 is programmed before the transfer of data from the first storage device to the second storage device is initiated. The alignment control logic 228 is programmed for generating a 4-bit signal (first control signal) via line 230 therefore causing one of the bytes B0 through B3, driven by the lines L(0)–L(3), to be selectively supplied at output 226 of multiplexers 216. The byte supplied by each of multiplexers 216 at output 226 is selected by the signal driven by the alignment logic such that this byte is positioned in the sequence of the four multiplexers, in a position corresponding to the same columns that this byte would occupy in the second configuration. Accordingly, multiplexers 216 generate at their output a double word aligned in the first dimension, i.e., aligned column-wise, according to the position that this double word should have in the second configuration of the second storage device.

FIG. 1 shows 12 bytes of data aligned in a first configuration. According to the first configuration of the first storage device shown in FIG. 1, the first byte of data starts at column 1, which is the second column from the right. The row wherein this byte resides is denominated as the first row, i.e. row 0. As one can see, the first byte of data is aligned in the first dimension in column 1, while this byte of data is aligned in the second dimension in row 0. The second byte of data is aligned in the first dimension in column 2 and in the second dimension in column 0, while the third byte of data is aligned in column 3, row 0.

Once the first row of data of the first storage device 2 of FIG. 1 is read out of that device, the alignment control logic 228, in conjunction with the first alignment stage including multiplexers 216, aligns bytes B1, B2 and B3, column-wise according to the second configuration. Accordingly, B1 is gated at the output of the multiplexer M3, B2 is gated at the output of the multiplexer M0, and the B3 is gated at the output of the multiplexer M1. As one can see, the first stage, controlled by the alignment control logic 228, takes care of aligning data column-wise. The next step is aligning data according to the rows in which this data is to be found in the second configuration of the second storage device 4 of FIG. 1. For example, alignment in the second dimension, i.e., row-wise, according to the second configuration, in the second storage device 204, demands that the first byte B1 resides in row 0, while the bytes B2 and B3 reside in row 1.

A second alignment stage 240, responsible for alignment according to rows, has an input 242 coupled to the output of the first alignment stage 212 and an output 244 coupled to the second storage device. Additionally, the second alignment stage 240 includes a control gate 244. The control gate 244 is coupled to the alignment control logic 228 for receiving, via line 242, a row align signal (second control signal). In response to this signal, the second alignment stage 240 generates, at its output 244, bytes of data aligned in a second dimension, i.e., row-wise, according to the second configuration.

The output 244 of the second alignment stage 240 is coupled to the second storage device via four 8-bit output lines O(i) for i=0 through N−1. In this particular example, N is 4. Each of the lines O(i) for i=0 through 3 is coupled to the second storage device such that a byte of data residing, at the output of the second alignment stage, in the $i^{th}$ row can be written into the second storage device at a location corresponding to the $i^{th}$ row. Accordingly, the second alignment stage 240 outputs, in each cycle, data aligned, both in the first and the second dimension, according to the configuration of the second storage device. In this case, in one cycle, the output line O(3) drives byte B1 of the first storage device. In the same cycle, lines O(2), O(1), and O(0), contain "don't care" data. In the next cycle, the output lines O(3), O(2), O(1), and O(0) contain the sequence of bytes B5, B4, B3 and B2.

The second alignment stage 240 includes odd temporary storage devices 248 S(i) and even temporary storage devices 246 $\overline{S}(i)$ for i=0 through 3. The odd temporary storage device 248 includes, by way of non-limiting example, four flip-flops $S_0$, $S_1$, $S_2$ and $S_3$. The even temporary storage device $\overline{Si}$ includes four flip-flops, $\overline{S0}$, $\overline{S1}$, $\overline{S2}$ and $\overline{S3}$. Each of flip-flops 246 and 248 include a control gate 244 which is coupled to alignment control logic 228 via line 242. The alignment control logic 228 is adapted to generate control signals (enable signals) via line 242 such that each of the temporary storage devices, the even and the odd, contain four bytes of data belonging to two consecutive rows of data of the second configuration.

Figure 2A:
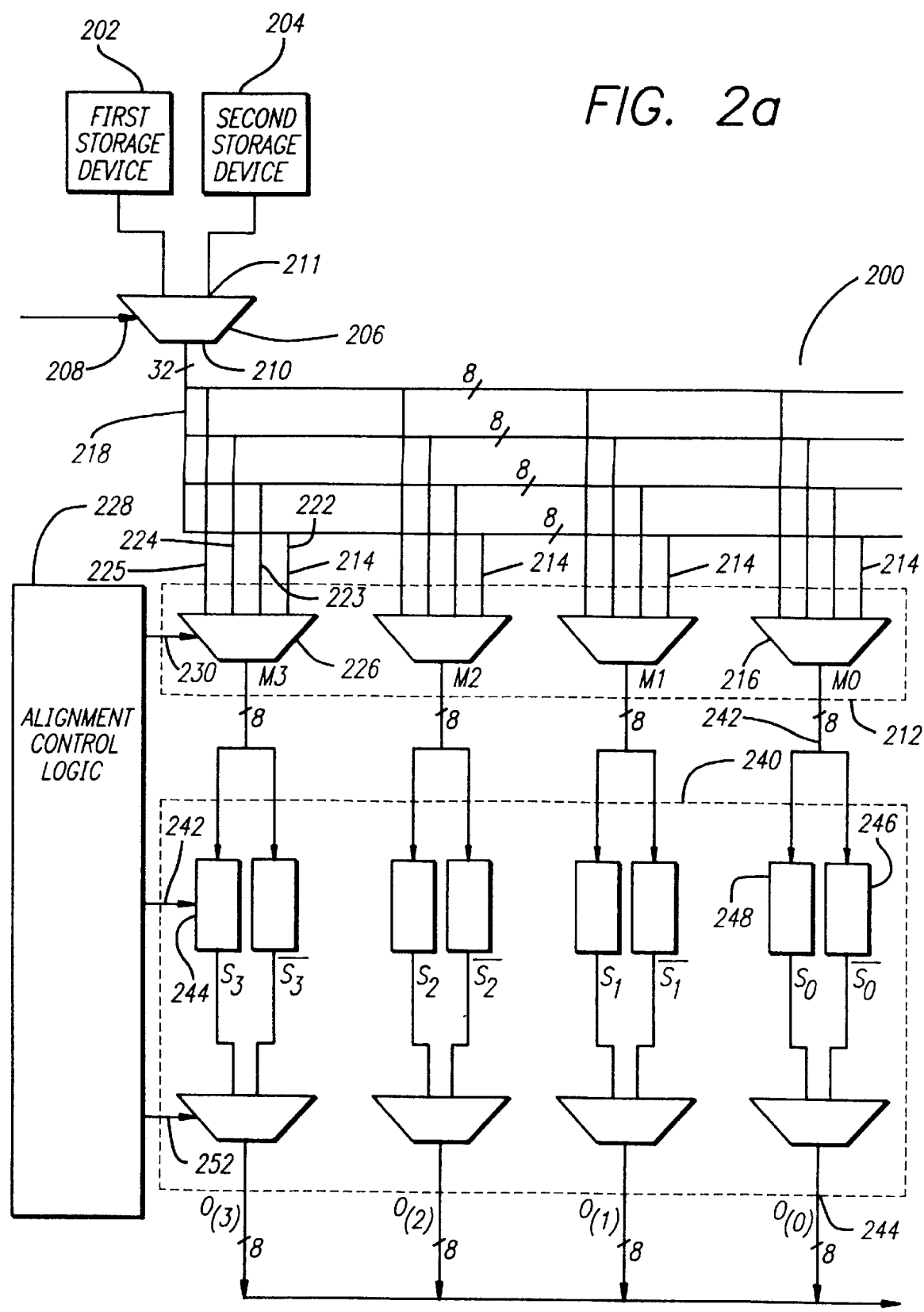
FIG. 2a illustrates an embodiment of the apparatus for transferring segments of data according to the present invention.
Figure 2B:
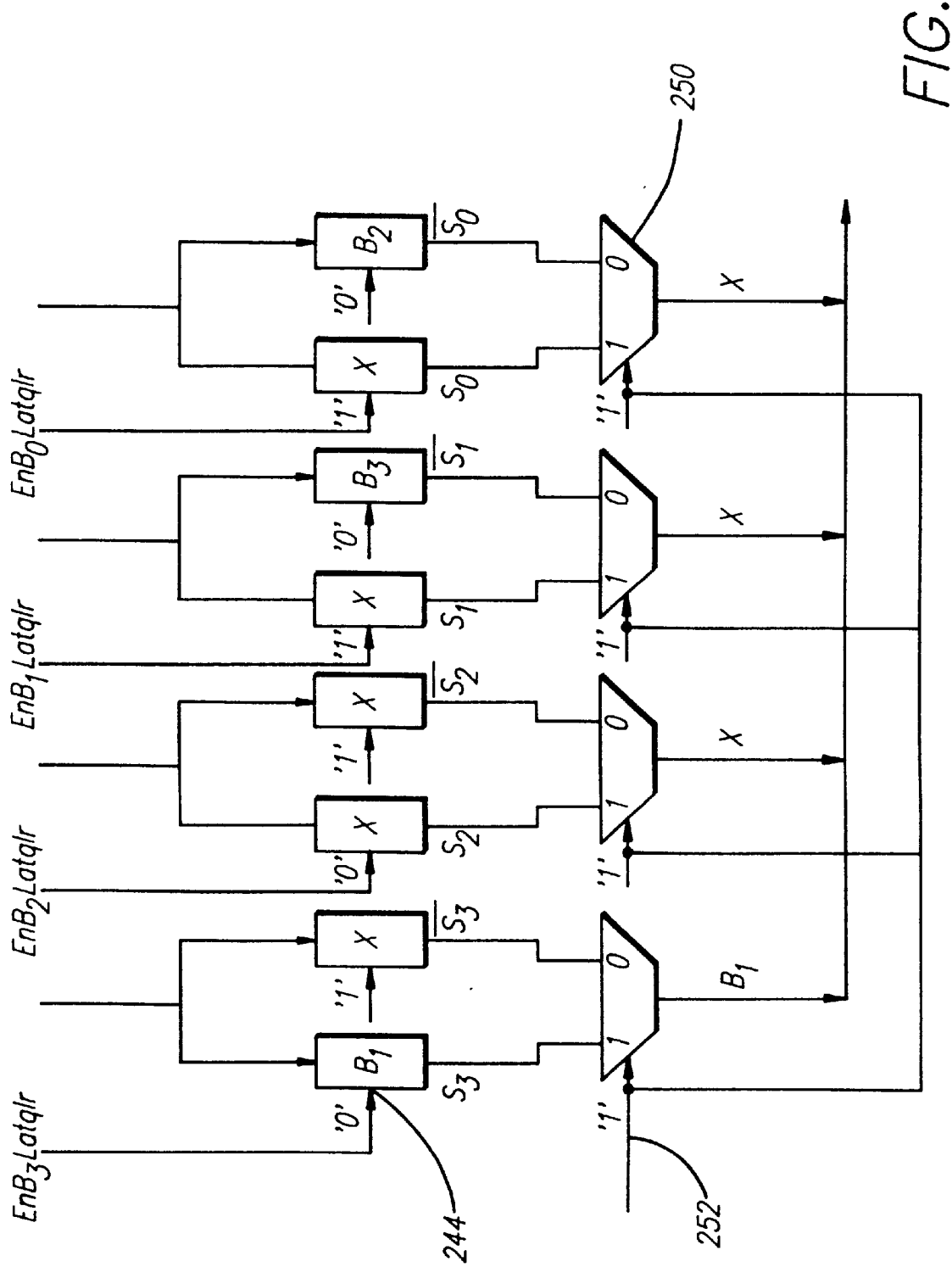
FIG. 2b illustrates a first example of data configuration in the second alignment stage of the apparatus according to the present invention.

The operation of the second alignment logic in conjunction with the alignment control logic is explained, for one type of configuration of data, in conjunction with FIG. 2b. FIG. 2b shows the first row including bytes B1, B2, and B3 of the first storage device 2 shown in FIG. 1 written to the temporary storage devices S(i) and $\overline{S}(i)$. More specifically, byte B1 is latched into the flip-flop S3, byte B2 is latched into the flip-flop $\overline{S0}$, and byte B3 is latched into the flip-flop $\overline{S1}$. The alignment control logic 228 (not shown in this figure) generates control signals Enbi to gates 244 of the flip-flops S(i) and $\overline{Si}$ for i=0 through 3. In the implementation of FIG. 2b, flip-flops S3, $\overline{S1}$, and $\overline{S0}$ receive control signals Enbi set to logic level '0.' The alignment control logic 228 (not shown) also generates control signals to a second set of multiplexers 250. Multiplexers 250 are coupled to the odd and even temporary storage devices as shown in FIG. 2b. The alignment control logic 228 generates a third control signal via line 252 to a control input of multiplexers 250. Alignment control logic 228 generates, alternately, low and high control signals to the multiplexers 250, such that each cycle a different input of multiplexers 250 is selected at the output of these multiplexers. According to this scheme, in each cycle, multiplexers 250 select data stored in either the odd temporary storage device or the even temporary storage device.

In the particular example shown in FIG. 2b, alignment control logic 228 generates a logic 1 signal via line 252, thereby selecting the odd temporary storage devices $S_0$–$S_3$. Accordingly, multiplexers 250 output a double word of data in the sequence $B_1$XXX, where X is a "don't care."

Figure 2C:
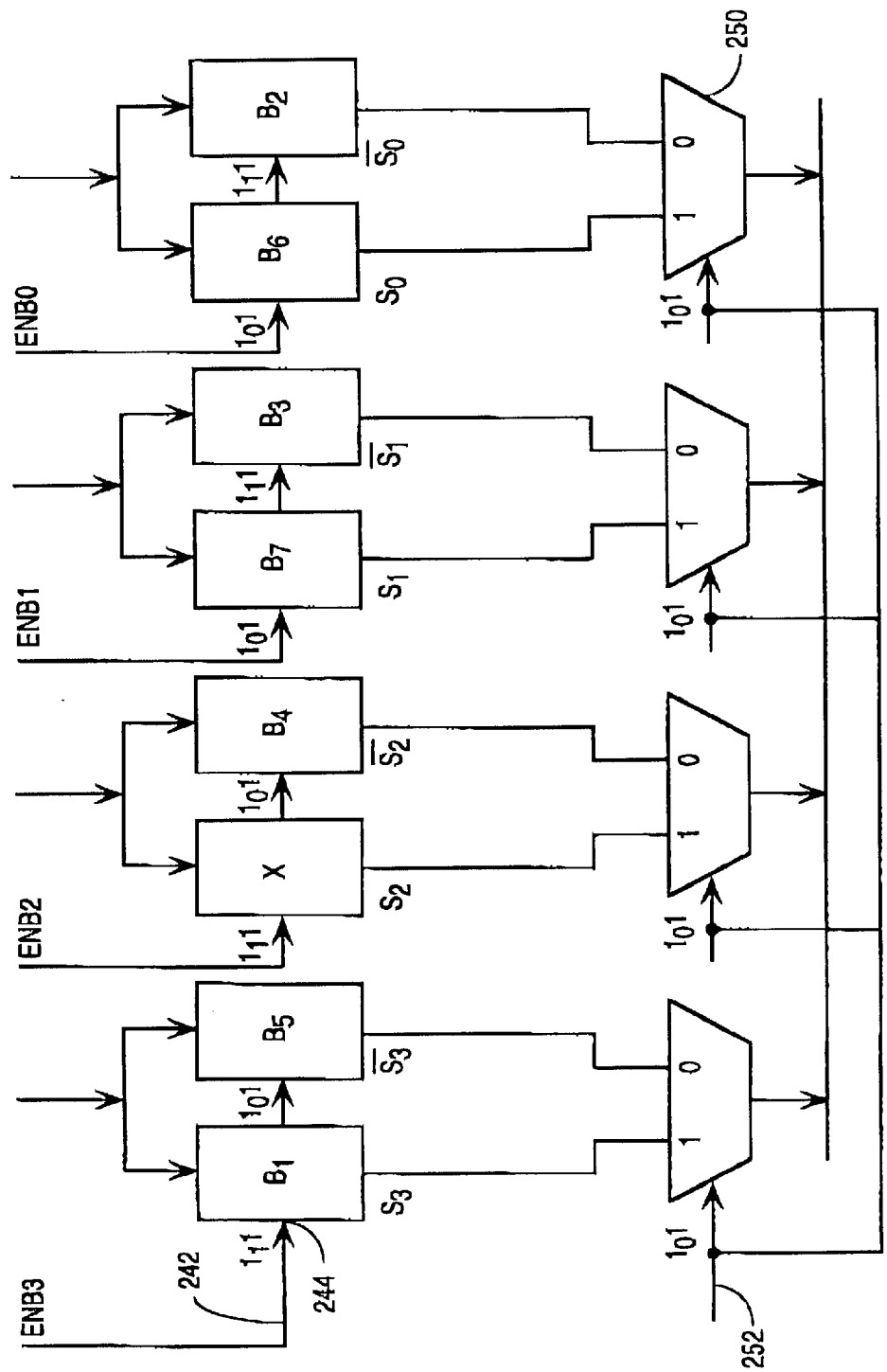
FIG. 2c illustrates a second example of data configuration in the second alignment stage of the apparatus according to the present invention.

In the next cycle, a second row of data residing at address 000 0204H, in the first storage device 2 shown in FIG. 1, is read from this storage device. Multiplexers 216 receive control signals from alignment control logic 228, such that these multiplexers gate at their output the four bytes of the second row of data of the first storage device in the sequence B5, B4, B7, and B6. The sequence B5, B4, B7, and B6 read from the first storage device is transferred onto the temporary storage device Si for i=0 through 3 as shown in FIG. 2c. This sequence is aligned in the first dimension, i.e., column-wise, according to the configuration stored in the second storage device 4 of FIG. 1. The alignment control logic 228 generates a second control signal to the temporary storage devices S(i) and $\overline{S}(i)$. The second control signal generated via line 242 enables the flip-flops $\overline{S3}$ to store byte B5, $\overline{S2}$ to store B4, S1 to store B7, and S0 to store B6, as one can see from FIG. 2c.

FIG. 2c shows the content of the temporary storage devices of the second alignment data after the second row of data has been read from the first storage device 2 of FIG. 1. As one can see, the second alignment stage stores in the flip-flops $\overline{S3}$, $\overline{S2}$, $\overline{S1}$ and $\overline{S0}$, the bytes B5, B4, B3, and B2, respectively. Bytes B2, B3, B4, and B5 are aligned according to the second row of the configuration shown in the second storage device 4 of FIG. 1. The alignment control logic 228 also generates a third control signal to the multiplexers 250 which causes selection of the odd temporary storage devices $\overline{S0}$, $\overline{S1}$, $\overline{S2}$, and $\overline{S3}$ by such that the double word B5, B4, B3, and B2 will be written to the second storage device 4 of FIG. 1.

Bytes B6 and B7 are also written into the temporary storage devices of the second alignment stage concomitantly with bytes B4 and B5. As one can see from FIG. 2c, B6 is stored in flip-flop S0, while B7 is stored in flip-flop S1. In so doing, the apparatus of the present invention overcomes the deficiencies associated with devices having only one temporary storage device which would require a second reading of the data stored in the second row of the first storage device 2 of FIG. 1. As mentioned earlier in this application, a circuit having only one temporary storage device would have to re-read the second row of data of the first storage device because the temporary storage device would become full after bytes B2, B3, B4, and B5 were stored therein. The apparatus according to the present invention, thus, overcomes this deficiency by providing both an additional set of temporary storage registers, i.e. odd and even temporary storage devices and the multiplexers 250, and the alignment control logic associated thereto. The alignment control logic 228 which generates control signals to the temporary storage devices S(i) and $\overline{S}(i)$ and to multiplexers 250, takes into account the configurations of both the first storage device and the second storage devices as it will be explained later in this description.

Figure 3:
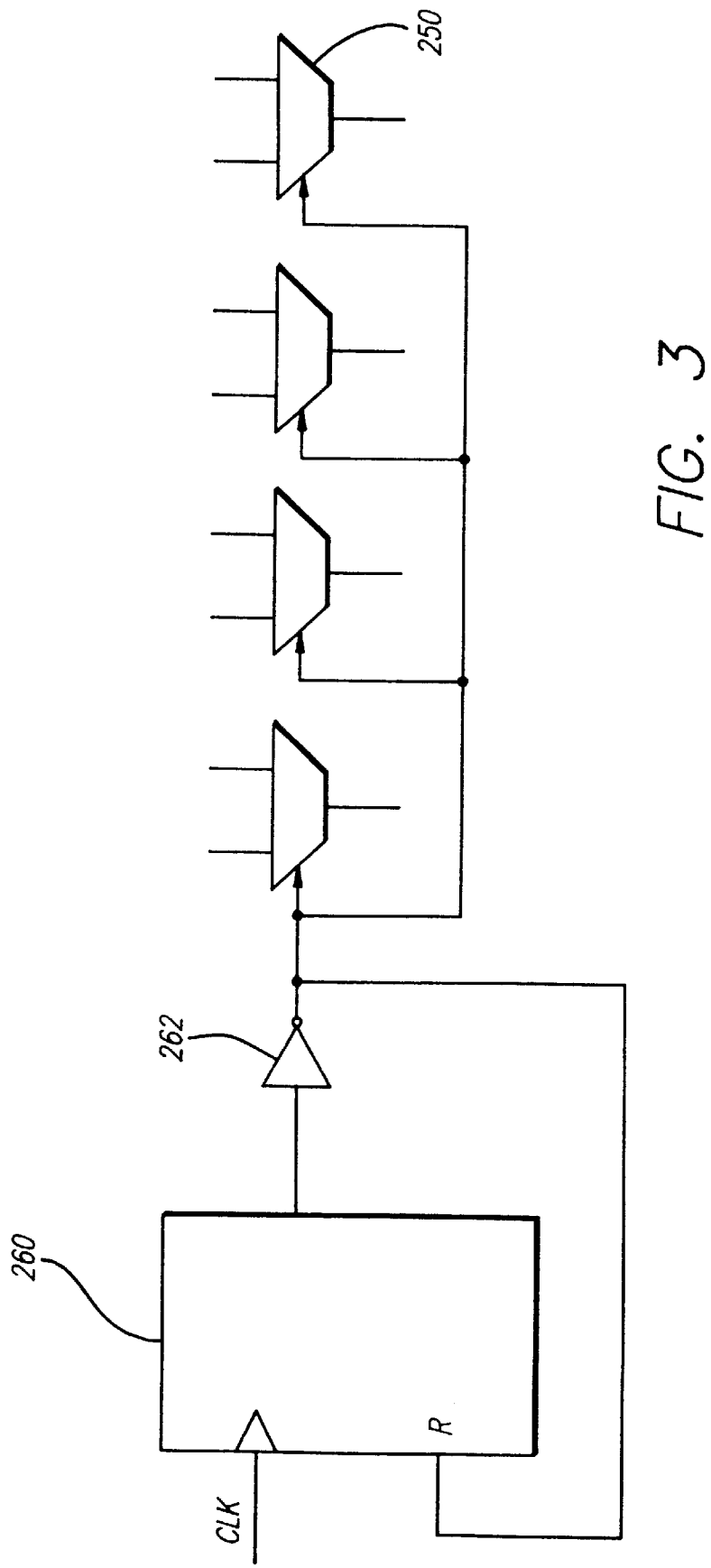
FIG. 3 illustrates a circuit for generating control signals to a set of multiplexers of the second alignment stage.

FIG. 3 shows a circuit for generating in an alternate manner enable signals to the multiplexers 250 shown in FIGS. 2a–2c. Flip-flop 260 is coupled to an inverter 262 which is further coupled to the four multiplexers 250. The output of inverter 262 is also fed back to a SET gate of flip-flop 260. Due to this feedback, flip-flop 260 alternately outputs signals at logic "0" and logic "1". In this manner, flip-flop 260 alternately selects the content of the odd temporary storage cells in one cycle, and the content of the even temporary storage cells in the following cycle and so on.

FIG. 4 shows a pseudo-code listing, in pseudo-VHDL, for the alignment control logic 228. In line 1 of this listing, the processing logic, i.e., pseudo-VHDL program, compares the address of the data aligned in the first configuration, i.e., ADRALGSTART, with the address of the data aligned in the second configuration, i.e., ADRALGEND. ADRALGSTART typically denotes the column number at which the data to be transferred starts. Similarly, ADRALGEND denotes the column number at which the data in the second configuration starts. If the first byte in the first configuration of the data to be transferred starts at the same column as the first byte of the data aligned in the second configuration, then the processing logic generates a result ALG 33 22 11 00. ALG 33 22 11 00 means that the alignment logic circuit maps each byte of each row of the data to be transferred "transparently." In other words, the byte of data located in column 0 of the source storage device is transferred to column 0 of the destination storage device, byte 1 in the source storage device is transferred to byte 1 in the destination storage device, byte 2 is transferred to the byte 2 of the destination storage device, and byte 3 of the source storage device is transferred to the byte 3 of the destination storage device. Assuming that the first byte of the first configuration needs to be transferred to a different byte location in the second configuration, then the processing logic of the alignment control logic 228 checks lines 2, 3, and 4 where it determines what type of mapping of data is required. For example, as one can see, depending on the particular way in which data is configured in the second storage device relative to the first storage device, the vectors ALG (32 21 10 03), ALG (31 20 13 02), or ALG (30 23 12 01) are determined. The first vector ALG 32 21 10 03 corresponds to a 3-byte shift of data. In other words, if the first byte of data appears in the second configuration in a location shifted by 3 bytes, then the alignment processing logic generates the vector ALG 32 21 10 03. During this part of processing, the processing logic checks to see if the address of a byte positioned in column 0 of the first configuration is shifted in the second configuration to correspond to column 3, i.e., (ADRALGSTART=0 and AARALGEND≧3). Similarly, if a byte in the first storage device positioned in column 1 is aligned with a byte corresponding to column 0 of the second storage device or if the source address is 2 and the address of the destination is 1, or if the source address is 3 and the destination address is 2, then the vector ALG 32 21 10 03 is generated. The other two vectors ALG 31 20 13 02 and ALG 30 23 12 01 are similarly generated, each corresponding to a different shift in the configuration.

Lines 5, 6, 7, and 8 of the listing shown in FIG. 4 represent the outputs of the multiplexers 216. For example, MUXOUT (31 down to 24) represents the output of the multiplexer corresponding to the most significant 8 bits of a double word in the second configuration. Similarly, MUXOUT (23 down to 16) represents the output of the multiplexer M2 of the first alignment stage. As one can see, the lines 5, 6, 7, and 8 of the alignment processing logic determine which of the inputs ALGIN should be gated to an output MUXOUT of the respective multiplexer. For example, the output of the multiplexer M3 of FIG. 2a will receive the input ALGIN (31 down to 24) when the alignment processing logic detects that the first and the second configurations are identical, i.e., the bytes of data from the block of data to be transferred need not be shifted, but they remain in the same position. In this case, if the vector ALG 33 22 11 00 equals 1 logic, i.e., this value is TRUE, then the output of the multiplexer M3 is supplied the input ALGIN which corresponds to the most significant byte of the configuration stored in the source storage device. Looking at FIG. 2a, multiplexer M3 selects the eight bytes which are driven by the line L(3). Lines 6, 7, and 8 of the listing similarly determine the outputs at the multiplexers M2, M1, and M0 of the first alignment stage 212 based on the shift in the second configuration relatively to the first configuration. Lines 9, 10, 11, and 12 show how the processing logic determines the second control signals to the second alignment stage 240. More precisely, ENB3 denotes the enable control signal to the flip-flops of the second alignment stage. The byte enable signals determine which bytes are selected on an odd/even cycle. Once the byte enable signals Enbi are determined, these signals alternate every data cycle.

FIGS. 5a and 5b show in tabular form the way in which the first alignment stage shifts bytes of data at the outputs of the four multiplexers in order to provide alignment according to columns. This figure also shows in a tabular form which of the flip-flops of the second alignment stage are enabled to provide alignment according to rows. The first column shows the shift in position from the source to the destination. For example, FIG. 5a shows, in the first column and the bottom row of this figure, the case where byte 1 of the first configuration in the source storage device is shifted to the position of byte 3 in the second configuration in the destination storage device, as the example in FIG. 1 illustrates. The second column illustrates, for all four multiplexers, the routing of four bytes of input at each multiplexer. For example, B3 to B1 shows that the byte located in the 4th column, i.e., the left-most column of the first configuration, is moved to the byte, in the second configuration, positioned in column 1, i.e., the second column from the right. Similarly, the other three lines show the shift in byte position for the rest of the bytes. The third column lists the control signals to the temporary storage devices 246 and 248 of the second alignment stage 240. For example, flip-flops S3, S2, $\overline{S1}$, and $\overline{S0}$ are enabled for aligning data column-wise. This corresponds to FIG. 2b where latches S3, S2, $\overline{S1}$, and $\overline{S0}$ are enabled.

It should be apparent to one skilled in the art that the alignment logic circuit according to the present invention may be implemented for storage devices have more than 2 dimensions (rows and columns). For example, the alignment logic according to the present invention can be used in conjunction with stored data which can be addressed by addresses that specify a third dimension address is addressed in addition to row and column addresses. Such alignment circuit may include logic circuits, having the same functionality and structure similar to the logic circuits described in the foregoing, but that takes into account the additional dimensions for addresses of data.

Figure 6:
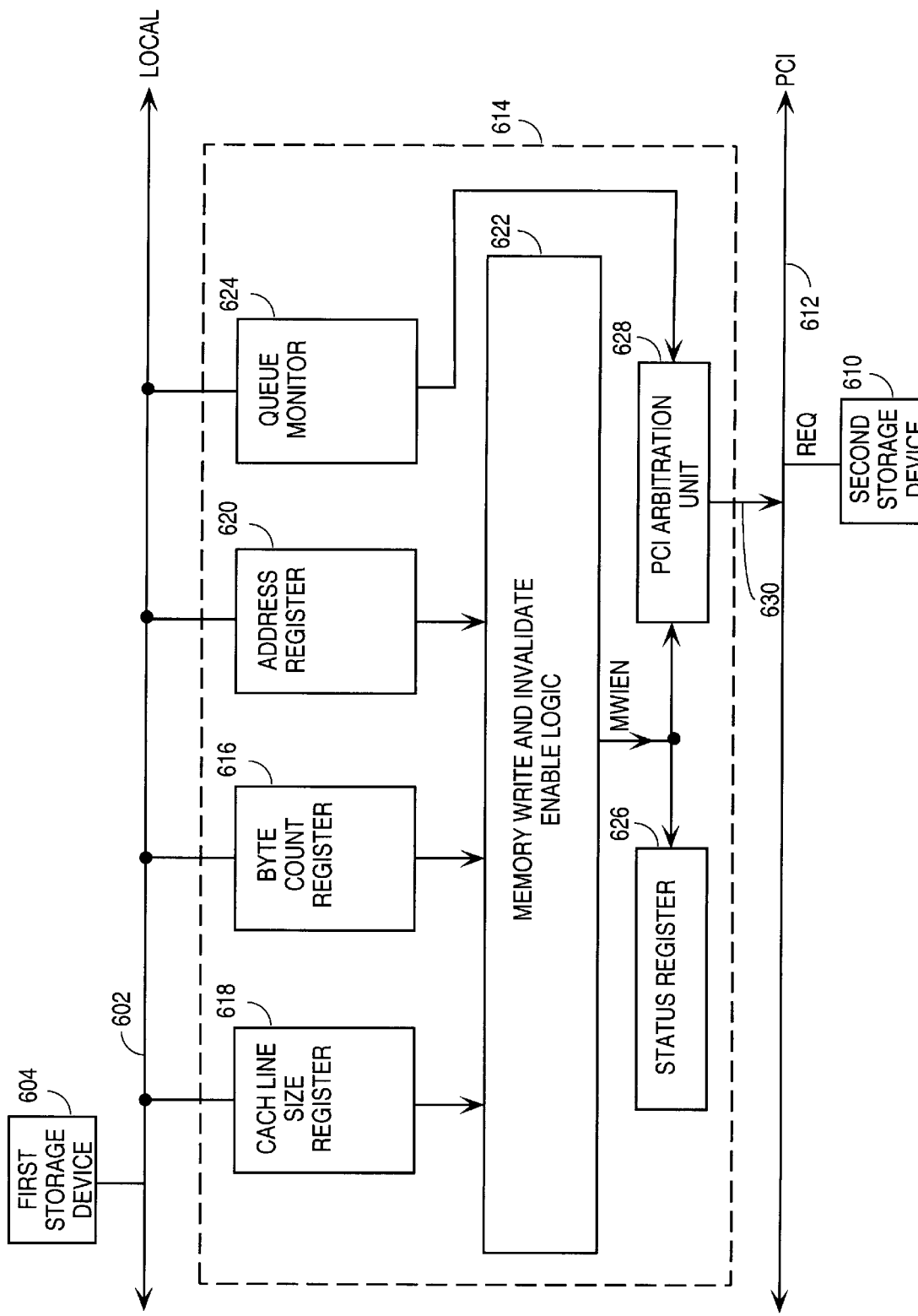
FIG. 6 shows a block diagram of a second embodiment according to the present invention.

FIG. 6 shows a block diagram of a second embodiment according to the present invention. A computer system 600 is shown with local bus 602 coupled to first storage device 604. The computer system 600 further includes a peripheral bus 612 which can be, by way of non-limiting example, a PCI bus. A second storage device 610 is coupled to PCI bus 612. The second storage device can be a cache memory, by way on non-limiting example. Cache memory 610 is partitioned into a plurality of bytes (not shown) and plurality of cachelines (not shown). Each cacheline includes a first predetermined number of bytes.

The computer system shown in FIG. 6 further includes a DMA controller 614 (shown in dotted lines) that transfers data between the first storage device 604 and the second storage device 610. The DMA controller includes a first circuit 616 stores a DMA byte count. The first circuit 616 is hereinafter referred to as "byte count register". The DMA controller includes a second circuit 618 that stores a predetermined number of storage lines. The second circuit is hereinafter referred to as "cacheline size register." The DMA controller further includes a third circuit 620 that stores a current transfer address. The third circuit 620 is hereinafter referred to as "address register." The DMA controller 614 further includes a Memory Write and Invalidate (MWI) enable logic circuit 622 coupled to the cacheline size register 618, to the byte count register 616, and to the address register 620. The Memory Write and Invalidate enable logic circuit generates an enable signal $MWI_{en}$ when the DMA byte count stored in the byte count register 616 is greater or equal than a first predetermined number which is equal to a cacheline size and the current transfer address stored in the address register 620 is a multiple of the first predetermined number N.

FIG. 6 further shows a queue monitor 624 that determines the current number of words of data awaiting transfer in a queue (not shown) of the DMA controller 614. The DMA circuit 614 further includes a status register 626, coupled to the Memory Write and Invalidate Enable Logic circuit 622. Status register 626 has a bit (not shown) that indicates whether a MWI or a Memory Write (MW) cycle is being performed by the DMA controller. A PCI arbitration unit 628 coupled to the memory write and invalidate enable logic circuit 622 and to the queue monitor 624 generates a request signal 630 to the second bus 612. The PCI arbitration unit typically arbitrates for the PCI bus generating the signal request REQ 630 when the Memory Write and Invalidate Enable Logic circuit or a Memory Write circuit (not shown) indicates that a MWI or respectfully a MW cycle is pending in the DMA controller. The PCI arbitration unit utilizes a request handshake protocol. When the DMA controller requires the PCI bus, the DMA controller asserts its request REQ# output.

The status register 626, as explained above, includes a bit which can be set to 0 or 1, indicating whether a memory write (0) or a memory write and invalidate (1) needs to be executed. The memory write command is a command compatible with the PCI system architecture which is used to update data in the memory. A memory write and invalidate (MWI) command is semantically identical to the memory write command except that it additionally guarantees a minimum transfer of one complete cacheline during the current transaction. According to this command the master (DMA controller) intends to write all bytes within the address cacheline in a single PCI transaction unless the master is interrupted by the target (second storage device 610). This command allows a memory performance optimization by invalidating a (dirty line) in a write-back cache without requiring the actual write-back cycle, thus shortening access time. More information about the PCI systems and the memory write and invalidate command can be found in the PCI Local Bus Specification, revision 2.1 of the PCI Special Interest Group located in Portland, Oreg.

To satisfy the PCI requirements for a memory write and invalidate command, a PCI master such as the DMA controller 614 shown in FIG. 6 starts a transaction on a cacheline boundary and transfers at least one cacheline of data without interruption. A cacheline boundary is defined as the boundary between two adjacent cachelines. The present invention provides circuitry permitting the requirements of PCI and implementing a hardware mechanism able of handling a DMA transfer between the local (first) and the peripheral (second) storage devices by using a single DMA chain descriptor.

Figure 7:
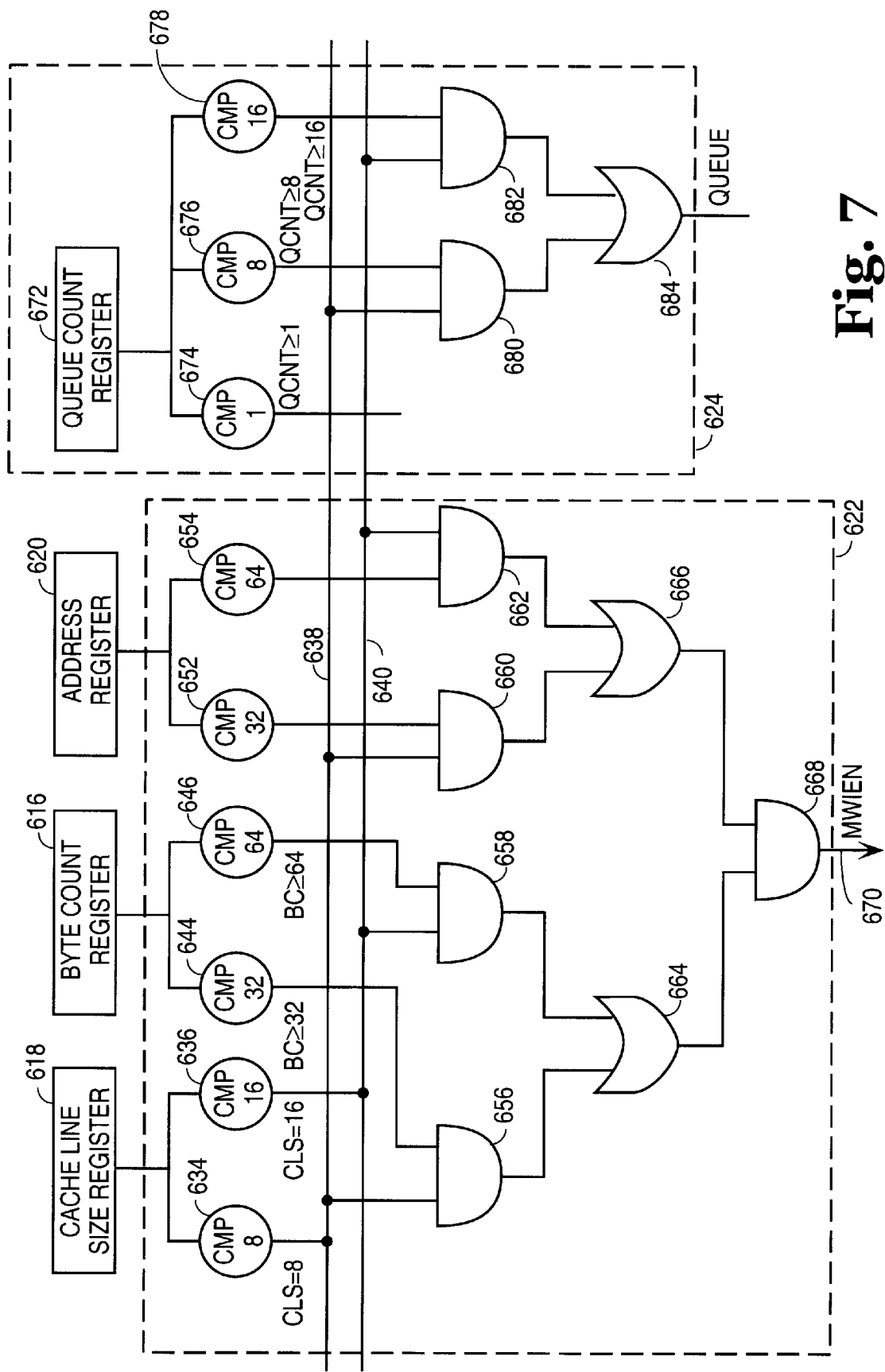
FIG. 7 shows in more detail a second embodiment according to the present invention.

FIG. 7 shows a more detailed illustration of the DMA controller 614 of FIG. 6. The Memory Write and Invalidate enable logic circuit 622 includes comparators 634, 636, 644, 646, 652, and 654. The functioning and interconnections of these comparators is further explained in conjunction with the rest of the structure of DMA controller 614. The cacheline size register 618 typically stores a predetermined number of bytes which defines the length of a cacheline. Typically a cacheline can have 8 or 16 double-words, but the present invention is not limited to these numbers. Comparators 634 and 636 compare the content of cacheline size register 618 with a number 8 or 16 respectively. Depending on what the value of the first predetermined number N stored in the cacheline size register 618, one of comparators 634 or 636 outputs a high signal. For example, assuming that the cacheline size register 618 contains the predetermined number 8, comparator 634 outputs a high signal at line 638. However, if the predetermined number stored in register 618 is 16, comparator 636 outputs a high signal at the output of this comparator. Comparator 636 is coupled at its output to line 640. The DMA controller 614 further includes byte count register 616. Byte count register 616 typically stores the current number of bytes of data to be transferred in a typical DMA transaction. Comparators 644 and 646 are coupled to byte count register 616 for comparing the current byte count, with either number 32 or 64 respectively. Depending on whether the cacheline size of the cache is 8 double words or 16 double words, and byte count register includes a byte count that is equal or larger than 32 or equal or larger than 64, the comparators 644 and respectively 646 outputs a high logic signal.

Address register 620 stores the current transfer address of a destination storage location in the second storage device. Comparators 652 and 654 which are coupled to address register 620 determine whether the current transfer address stored in address register 620 is a multiple of the first predetermined number N stored in the cacheline size register 618. More specifically, comparator 652 checks if the five least significant bits of the current transfer address are zero. In case the five least significant bits of the current transfer address are all equal to zero, then it is determined that the current transfer address is a multiple of the first predetermined number N, i.e., 32. Similarly, the comparator 654 checks if the six least significant bits, of the current transfer address stored in address register 620, are all zero. If the six least significant bits, of the current transfer address, are all zero, then it is determined that the current transfer address is a multiple of 64. Therefore, depending on whether a cacheline size is 8 double-words (32 bytes) or 16 double-words (64 bytes), comparators 652, respectively, 654, generate a high logic signal, if the current transfer address is a multiple of 32, respectively, 64.

The Memory Write and Invalidate enable logic circuit further includes a fourth circuit. The fourth circuit includes AND gate 656 coupled to line 638 and to the comparator 644. Gate 656 outputs a signal having logic value 1 if the cacheline size is determined to be 8 and the byte count register is determined to be equal or greater than 32. The fourth circuit further includes AND gate 658 which is coupled at its input to line 640 and to a comparator 646. The AND gate 658 outputs a signal having logic value 1, if it is determined by the comparator 636 that the cacheline size is 16 and the byte count in the byte count register 616 is equal or greater than 64. The outputs of gate 656 and 658 are further coupled to an OR gate 664 included in the fourth circuit. If any of gates 656 or 658 output a signal having logic value 1 (i.e. if the byte count is greater than or equal to the cacheline size), then the output of the OR gate 664 is set to 1.

The Memory Write and Invalidate enable logic circuit 622 also includes a fifth circuit. The fifth circuit includes AND gate 660 that has an input coupled to line 638 and another input coupled to the comparator 652. The AND gate 660 is used to determine whether the current transfer address is on a cacheline boundary. Assuming that the cacheline size is determined to be 8, by the comparator 634, if the comparator 652 determines that the current transfer address is a multiple of 8, then the output is set to logic level 1. Accordingly, the output of gate 660 is high. The fifth circuit also includes an AND gate 662 which has an input coupled to line 640 and another input coupled to comparator 654 generates a high signal at its output if it is determined by comparators 636 and 654, respectively, that the cacheline size is 16 and the current transfer address stored in the address register 620 is a multiple of 16. The fifth circuit also includes OR gate 666, which is coupled to gates 660 and 662, outputs a high signal if any of its inputs are set at 1. In other words, if it is determined that the current transfer address is a multiple of the cacheline size, whatever the cacheline size might be, then the output of the gate 666 is set at logic level 1. The MWI enable logic circuit 622 also includes the AND gate 668 having one input coupled to the output of gate 664 and another input coupled to the output of gate 666. The gate 668 outputs a signal $MWI_{en}$ if both of its inputs are set at logic level 1. In other words, the output of gate 668 is 1 if both the byte count register is equal to or greater than a cacheline and the current transfer address is on a cacheline boundary, i.e. the current transfer address is a multiple of the cacheline size. If the current transfer address is on a cacheline boundary and the byte count register is equal to or greater than a cacheline, a MWI cycle is enabled by a bit in the status register 626 (shown in FIG. 6) which is updated by the $MWI_{en}$ signal 670. If, however, either an address is not on a cacheline boundary or the byte count register shows that the byte count is smaller than a cacheline, the DMA forces memory writes by having the gate 668 drive a "0" instead of a "1" in the status register 626 during an address cycle.

Assuming that the byte count is large enough to continue a transfer (i.e. the byte count is larger than the cacheline size but the current address is not on a cacheline boundary the DMA 314 will transfer bytes using a memory write cycle. This will typically be the case at the beginning of a DMA transfer when the first byte is not aligned on a cacheline boundary. Once a respective number of bytes, less than a cacheline size, has been transferred by a memory write mechanism and, thus, the first current byte in the queue is on a cacheline boundary, the MWI enable logic circuit 622 will output an $MWI_{en}$ signal to enable a MWI transfer. However, if the last bytes, of a block of data to be transferred via the DMA controller, are less than the cacheline size, then even though the current transfer address is a multiple of a cacheline size, the rest of the bytes is transferred by using a MW mechanism. A single chain descriptor can thus be used to provide memory writes followed by memory write and invalidate, and ending with memory write.

The queue count monitor 624 is illustrated in more detail in FIG. 7 in dotted line. The queue count monitor 624 includes a queue count register 672 which typically stores a current number of double-words awaiting transfer in a queue (not shown) of the DMA controller 614. The queue monitor 624 includes comparator 674, comparator 676, and comparator 678. Comparator 674 compares the current number of double-words waiting in the queue and stored in the queue count register 672 with "1" and outputs a signal queue count greater or equal than $QCNT \geq 1$. If the queue count is greater or equal than 1, then the signal output by comparator 674 is 1. Comparator 676 compares the current number of bytes of data awaiting transfer in the queue count register 672 with number "8." This comparator outputs the signal $QCNT \geq 8$ which is set high if the queue count is greater or equal than 8. Comparator 678, similarly, compares the queue count stored in queue count register 672 with number "16" and outputs a signal $QCNT \geq 16$ if the current number of bytes of data is equal or greater than 16.

The queue monitor 624 further includes a sixth circuit having AND gate 680, AND gate 682 and OR gate 684. AND gate 680 has an input coupled to the line 638 and another input coupled to the output of the comparator 676. If the cacheline size is 8 and the queue count is greater or equal than 8 gate 680 will output a signal having logic level 1. Similarly an AND gate 682 has an input coupled to comparator 678 and another input coupled to the line 640. If the cacheline size is 16 and the queue count is equal or larger than 16 the gate 682 will output a signal having logic value 1. OR gate 684 which has an input coupled to the output gate 668 and another input coupled to the output of gate 682. Gate 684 outputs a signal QUEUE having a logic value 1, if either of the gates 680 or 682 generates a signal having the logic value 1. More specifically gate 684 outputs a signal QUEUE having logic level 1 if the queue contains a number of words equal or greater than the cacheline size. This circuit is to ensure that in the case that the byte count register includes a number of bytes equal or larger than the cacheline size but due to proportion delay time, the queue count has become lower than a cacheline size, a PCI request circuit, which is explained in conjunction with FIG. 8, does not issue a PCI request to the PCI bus.

Figure 8:
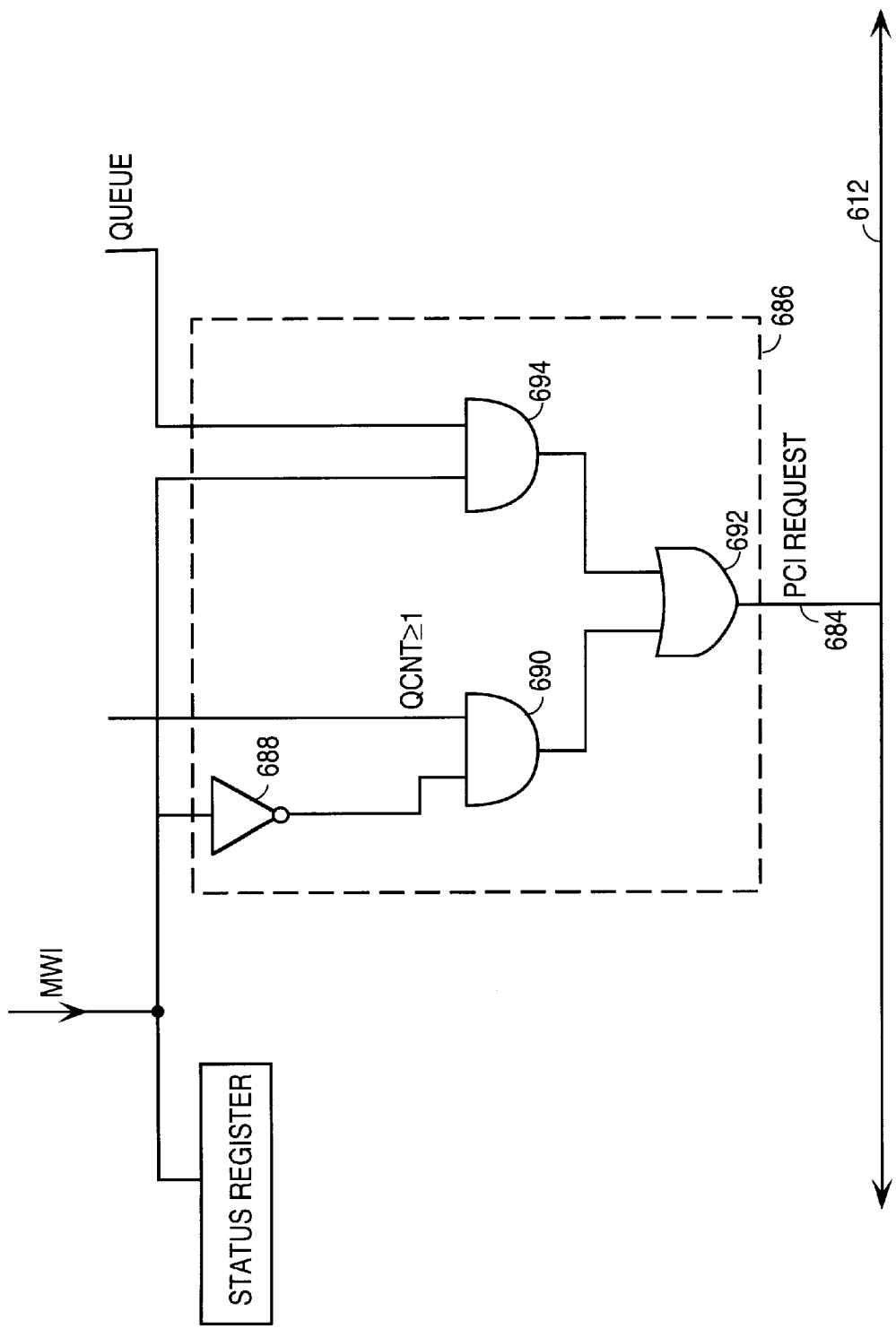
FIG. 8 shows a PCI request circuit according to the present invention.

FIG. 8 shows a seventh circuit, hereinafter referred to as a PCI request circuit 686. The PCI request circuit 686 is coupled to the MWI enable logic circuit and to the queue monitor shown in FIGS. 6 and 7. Circuit 628 generates a PCI REQUEST signal 684 to the PCI arbitration unit shown in FIG. 6. The PCI request circuit includes inverter 688 coupled to the output of the MWI enable logic circuit. The PCI request circuit further includes AND gate 690 that has an input coupled to the output of the inverter 688 and another input coupled to the queue monitor 624 for receiving the signal $QCNT \geq 1$. Gate 690, thus, provides a high signal if more than one word is found in the queue of the DMA controller and the DMA controller is in a memory write cycle.

Circuit 686 further includes OR gate 692 which is coupled at a first input thereof to the output of gate 690. OR gate 652 is coupled at a second input thereof to an output of AND gate 694. AND gate 694 has an input coupled to the MWI enable logic circuit and another input coupled to the queue monitor 624 for receiving the QUEUE signal. Accordingly, gate 694 generates a logic level 1 signal if the DMA controller is in a Memory Write and Invalidate cycle and the QUEUE signal indicates that the queue count is greater than a cacheline size. Accordingly, the PCI request circuit 686 generates a high PCI REQUEST signal if the DMA is in a memory write and the queue count is greater or equal than 1 or if the DMA is in a memory write and invalidate cycle and the queue count is equal or greater than a cacheline size.

Figure 9:
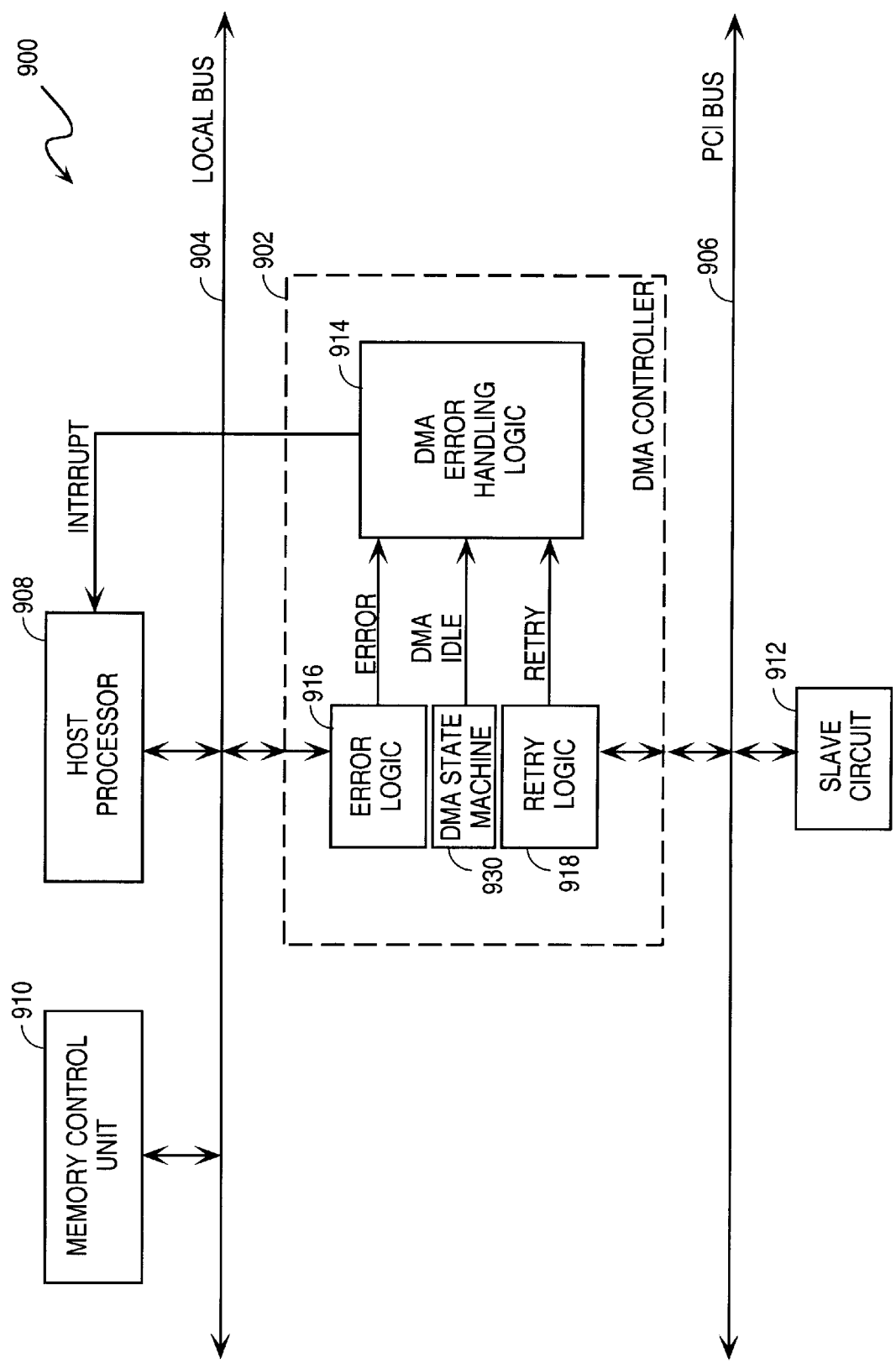
FIG. 9 shows a third embodiment of a computer system according to the present invention.

FIG. 9 shows a third embodiment according to the present invention, computer system 900. The system 900 includes a first bus 904 (hereinafter referred to as a local bus), and a second bus 906 (hereinafter referred to as a PCI bus). The computer system 900 according to the present invention further includes a host processor 908 coupled to the local bus 904 and a memory control unit 910 also coupled to the local bus 904. The computer system 900 also includes a slave circuit 912 coupled to the PCI bus 906. Moreover, the computer system 902 includes a Direct Memory Access (DMA) controller 902 with a DMA error handling logic 914, coupled to host processor 908. The DMA controller further has a DMA state machine 930 that generates a signal IDLE when the DMA is idle. The DMA error handling logic 914 has an input that receives from error logic circuit 916 an ERROR signal indicative of an error on local bus 904. The DMA error handling logic 914 further has a second input that receives from retry logic circuit 918 a RETRY signal indicative of a retry request of slave circuit 912. The DMA has a third input that receives an IDLE signal from DMA state machine 930. The DMA error handling logic 914 has an output 915, coupled to host processor 908, for aborting a DMA transfer when the ERROR signal is asserted, the RETRY signal is deasserted, and the DMA is idle.

Figure 10:
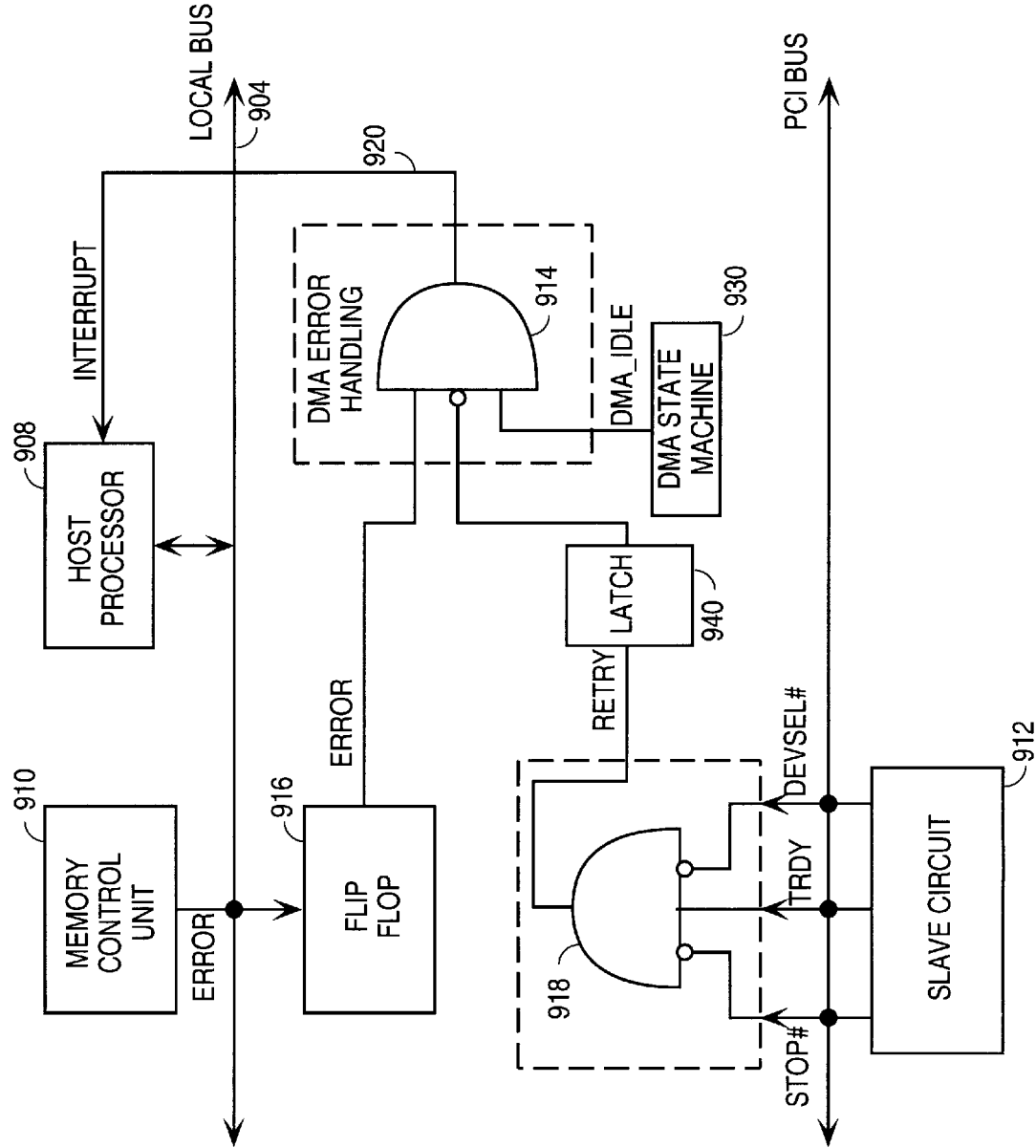
FIG. 10 shows a more detailed representation of the third embodiment of the computer system according to the present invention.

FIG. 10 illustrates in more detail the structure of DMA controller 902 of the computer system according to the present invention. The computer system according to the present invention is complying to PCI system architecture. A Retry request in PCI compliant computer systems, is typically generated by a slave circuit 912 to a master circuit such as the DMA controller 914 if the slave can not respond to a transaction at the current time. The slave signals "Retry" to the master and terminates the transaction. The master responds by ending the transaction in course and then retrying it later. An example of the need for a Retry, is the case where the slave circuit 912 is currently locked for exclusive access by another master. A Retry is generally indicated to the master by the slave circuit asserting a signal STOP# and deasserting a signal TRDY# while keeping the DEVSEL# asserted. This indicates to the master that the target that the slave does not intend to transfer the current data item (TRDY# deasserted) and that the master must stop the transaction # (STOP# asserted). The continued assertion of DEVSEL# indicates that the master must Retry the transaction at a later time. The master, i.e., the DMA controller can not terminate the DMA transfer until the Retry is satisfied.

Error logic circuit 916 is implemented, by way of non-limiting example, as a flip-flop. Flip-flop 916 receives an ERROR signal from the memory control unit 910 indicative of an error on the local bus 904. This ERROR can be a local bus parity error or a bus fault. The flip-flop 916 latches the ERROR signal sent by memory controller 910 and gates it to an output thereof. A Retry logic circuit is shown in the embodiment illustrated in FIG. 10 as a first AND gate 918. Gate 918 has a first inverted input for receiving a STOP# signal from the slave circuit 912. Gate 918 further has a second input for receiving a signal TRDY, and a third inverted input for receiving a signal DEVSEL# from slave circuit 912. The signals STOP#, TRDY, and DEVSEL# are PCI signals. The PCI 2.1 revised version explains these signals in more detail. The Retry logic circuit generates at its output a RETRY signal if the PCI conditions for a Retry are fulfilled. Accordingly, if the STOP# signal is asserted, the TRDY# signal is deasserted, and the DEVSEL# signal is asserted, the output of the AND gate 918 is set at logic level 1.

DMA controller 902 includes a latch 940 that saves the status of the RETRY signal (0 or 1) until a next access of DMA 902 to slave circuit 912 occurs. The DMA controller further includes the DMA error handling logic which in this particular embodiment includes a second AND gate 914. AND gate 914 has an input that receives the ERROR signal from flip-flop 916, a second inverted input that receives the RETRY signal from latch 917, and a third input that receives the IDLE signal from the DMA state machine 930. Accordingly, if an ERROR is detected by the memory control unit 910 and is gated to flip-flop 916, DMA error handling logic 914 asserts at the output 911 a signal having logic level 1 if the ERROR signal is asserted, the RETRY signal is deasserted, and the IDLE signal is asserted.

The RETRY signal is deasserted once the retry is serviced and the STOP# signal is at logic level 0. In this case, the output of gate 918 is set to zero logic, thus taking into account that this signal is fed into the inverted input of AND gate 914, the output of gate 914 is set at 1. At this time, after the retry has been serviced by the DMA controller (RETRY signal deasserted), the error status of the local bus 904 is mode "visible" to the host processor. Interrupt line 920, which is fed to an interrupt input pin of the host processor 908, causes the host processor 908 to abort the DMA transfer.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A computer system comprising:
   a first storage device;
   a second storage device partitioned into a plurality of bytes and into a plurality of storage lines, each storage line including a first predetermined number N of bytes; and
   a direct memory access (DMA) controller to transfer data between said first storage device and said second storage device, said DMA controller including a first circuit to store a byte count, a second circuit to store said predetermined number N, a third circuit to store a current transfer address, and a memory write and invalidate (MWI) logic circuit, coupled to said first, second, and third circuits, to generate a MWI enable signal when said byte count is greater than or equal to said predetermined number N and said current transfer address is a multiple of said number N.

2. The computer system of claim 1 wherein said byte count stored in said first circuit indicates the current number of bytes of data to be transferred between said first and said second storage devices.

3. The computer system of claim 2 wherein said current transfer address, stored in said third circuit, indicates the current address, in the second storage device, where a byte of data is to be transferred.

4. The computer system of claim 3 wherein said MWI logic circuit includes a fourth circuit, coupled to said first and second circuit, to compare said byte count with said predetermined number N.

5. The computer system of claim 4 wherein said MWI logic circuit includes a fifth circuits coupled to said first and third circuit, to determine whether said current transfer address is a multiple of said number N.

6. The computer system of claim 5 wherein said DMA controller further includes a status register, coupled to said MWI logic circuit, said status register having a bit for indicating MWI or memory write (MW) cycle.

7. The computer system of claim 6 wherein said DMA controller includes a queue and a queue monitor circuit to determine a current number of bytes of data awaiting transfer in said queue.

8. The computer system of claim 7 wherein said DMA controller includes a sixth circuit, coupled to said queue monitor, to determine whether said number of bytes awaiting transfer in said queue is equal or greater than a second predetermined number M.

9. The computer system of claim 8 wherein said DMA controller includes a seventh circuit, coupled to said MWI logic and to said sixth circuit, to request control over said peripheral storage device.

10. A computer system comprising:
    a host processor;
    a first bus coupled to said host processor;
    a second bus;
    a slave circuit coupled to said second bus;
    a direct memory access controller (DMA), to perform DMA transactions between said first and second busses, said DMA controller including a DMA error handling logic, coupled to said host processor, to receive a RETRY signal indicative of a retry request of said slave circuit, to receive an ERROR signal indicative of an error on said first bus, to receive and IDLE signal indicating that the DMA is idle and to abort a DMA transaction when said ERROR signal is asserted and said RETRY signal is deasserted.

11. The computer system of claim 10 wherein said DMA controller further includes a retry logic circuit to receive, from said slave circuit, signals indicating a retry request and responsive thereof to assert said RETRY signal.

12. The computer system of claim 11 wherein said DMA controller further includes an error logic circuit to generate said ERROR signal indicative of an error on said first bus.

13. The computer system of claim 12 wherein said error logic circuit includes a flip flop to store a logic value indicative of an error on said first bus.

14. The computer system of claim 13 wherein said retry logic circuit includes a first AND gate having a first inverted input, to receive a STOP# signal, a second inverted input to receive a DEVSEL# signal, and a third input to receive a TRDY signal.

15. The computer system of claim 14 wherein said DMA error handling logic circuit includes a second AND gate having a first input, to receive said ERROR signal, a second input to receive said IDLE signal, and a third inverted input to receive said RETRY signal.

* * * * *